(12) United States Patent
Reznar et al.

(10) Patent No.: US 7,104,744 B2
(45) Date of Patent: *Sep. 12, 2006

(54) SECONDARY LATCH FOR A TIRE CARRIER

(75) Inventors: Jason Reznar, Redford, MI (US);
Steve Battle, Walled Lake, MI (US);
Madhu Posani, Bloomfield Hills, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/465,372

(22) Filed: Jun. 18, 2003

(65) Prior Publication Data

US 2003/0210974 A1 Nov. 13, 2003

Related U.S. Application Data

(63) Continuation-in-part of application No. 10/127,298, filed on Apr. 22, 2002, now Pat. No. 6,692,216.

(51) Int. Cl.
*B66D 1/00* (2006.01)

(52) U.S. Cl. ...................................... 414/463; 414/466
(58) Field of Classification Search ................ 254/323; 414/463, 466
See application file for complete search history.

(56) References Cited

U.S. PATENT DOCUMENTS

| 5,188,341 | A  | * | 2/1993 | Greaves ...................... 254/323 |
| 6,079,932 | A  | * | 6/2000 | Boucher ..................... 414/463 |
| 6,267,546 | B1 | * | 7/2001 | Oxyer et al. ................ 414/463 |
| 6,390,452 | B1 | * | 5/2002 | Dobmeier et al. .......... 254/323 |
| 6,427,981 | B1 | * | 8/2002 | Kingsbury et al. ......... 254/323 |
| 6,435,479 | B1 | * | 8/2002 | Raz et al. ................... 254/323 |

* cited by examiner

*Primary Examiner*—James Keenan
(74) *Attorney, Agent, or Firm*—Dean B. Watson; Dura Automotive Systems, Inc.; Kevin S. MacKenzie

(57) ABSTRACT

A latch assembly for use a tire carrier has a wheel plate and a lock bracket and an aperture and a flexible member disposed in the aperture and connected to a wheel plate. The latch assembly has a lock housing, a guide adjacent and a lock arm. The lock arm has one end, another end, a cam surface and a lower cam surface. The one end is pivotally connected to the guide. The lower cam surface extends past the bottom of the lock housing. The weight of the housing acts on a stop member attached to the flexible member, to form a force to urge the lock arms to an unlocked position. When another end is moved toward the lock bracket, the cam surface engages the lock bracket to pivot the lock arm to a locked position so that when the flexible member breaks, the lock arm engages the lock bracket.

18 Claims, 10 Drawing Sheets

SECONDARY LATCH FOR A TIRE CARRIER

CROSS REFERENCE TO RELATED APPLICATIONS

This application is a continuation-in-part of U.S. patent application Ser. No. 10/127,298 issued as U.S. Pat. No. 6,692,216.

STATEMENT REGARDING FEDERALLY SPONSORED RESEARCH

Not Applicable

REFERENCE TO MICROFISHE APPENDIX

Not Applicable

FIELD OF THE INVENTION

The present invention generally relates to a tire carrier for a vehicle and, more particularly, to a secondary latch for maintaining the tire carrier in a stowed position.

BACKGROUND AND SUMMARY OF THE INVENTION

Vehicles with inflatable tires such as passenger cars, light and heavy duty trucks, tractor trailers, buses, commercial delivery vehicles, among other motorized forms of transportation and trailers pulled by such vehicles are conventionally equipped with spare tires. Some spare tires are stored under the vehicle using a tire carrier which includes a tire winch for raising and lowering the spare tire between a raised or stored position and a lowered or accessed position. The winch typically raises and lowers the spare tire using a flexible member such as a cable or cord, which is wound and unwound on a spool or reel. A secondary latch is often provided to secure the spare tire in the stored position. If the flexible member or winch fails while the spare tire is in the stored position, the secondary latch ensures that the spare tire remains in the stored position.

For example, U.S. Pat. No. 5,188,341, the disclosure of which is expressly incorporated herein in its entirety, discloses a secondary latch for a tire carrier. The secondary latch includes a latch member, which is pivotally mounted to swing a pair of arcuate fingers between a locked position and an unlocked position. The lock member is biased to the locked position by gravity. The lock member is selectively pivoted to the unlocked position by a lever, which is activated by a cranking member when engaging the winch.

In U.S. Pat. No. 6,079,932 a safety latch assembly is disclosed, which includes a pair of pivoted and spring loaded opposed latched to engage the shoulder portion of a support member. One latch has a cam or teeth to cause pivotable movement of the other latch. An actuator is required to pivotally move one latch on a pivot pin against the force of a spring to unlatch the shoulder. The pivotal movement of the one latch caused by the actuator moves the bottom end of the one latch outwardly and away from the shoulder and moves the top ends of the one latch inwardly in a latch housing. This movement of the one latch pushes the cam surfaces together to pivotally move the other latch against the force of its associated spring to unlatch the shoulder and release the safety latch.

Another example is shown in U.S. Pat. No. 6,267,546 issued to Dura Global Technologies, Inc, the disclosure of which is expressly incorporated herein in its entirety. The secondary latch assembly includes a sliding latch member supported by a horizontal support surface and an actuator adapted to selectively move the latch member along a linear path between a locking position and an unlocking position. The latch member is adapted to permit passage of the shank portion but not the head portion past the latch member when the latch member is in the locking position and to permit passage of both the shank portion and the head portion past the latch member when the latch member is in the unlocking position. The actuator includes an arm pivotable between the locking position and the unlocking position and having one end extending through an opening formed in the latch member such that pivotal movement of the arm linearly moves the latch member. The actuator further includes a spring member biasing the arm to the locking position. Various alternative embodiments are also disclosed wherein the actuator arm is connected to the latch member with a pin-and-slot connection and wherein the latch member has resilient fingers.

While these secondary latches may effectively retain the spare tire in the stored position under some conditions. They have numerous shortcomings. For example, these mechanisms are fairly complex require a relatively large number of parts, and are subject to corrosion from road salt. Accordingly, there is a need in the art for a secondary latch, which has reduced a number of total parts, is less prone to salt corrosion, and has reduced assembly complexity.

The present invention provides a latch mechanism for a vehicle, which overcomes some of the above-noted problems of the related art. According to the present invention, a latch assembly is adapted for use with a vehicle tire carrier. The tire carrier has a flexible member, a tire and a lock bracket. The lock bracket has a portion forming an aperture. Additionally, a hook mechanism is disposed in the aperture for latching the tire to the lock bracket when the flexible member breaks.

The advantage of the present invention is that the latch device is simple, more reliable and requires fewer parts. From the foregoing disclosure and the following more detailed description of the preferred embodiment, it will be apparent to those skilled in the art that the present invention provides a significant advance in the technology and art of latching mechanisms. Particularly significant in this regard is the potential the invention affords for providing a lightweight, high quality, feature-rich, low cost assembly. Additional features and advantages of the preferred embodiment, will be better understood in view of the detailed description provided below.

BRIEF DESCRIPTION OF THE DRAWINGS

These and further features of the present invention will be apparent with reference to the following description and drawings, wherein.

Figure 1:
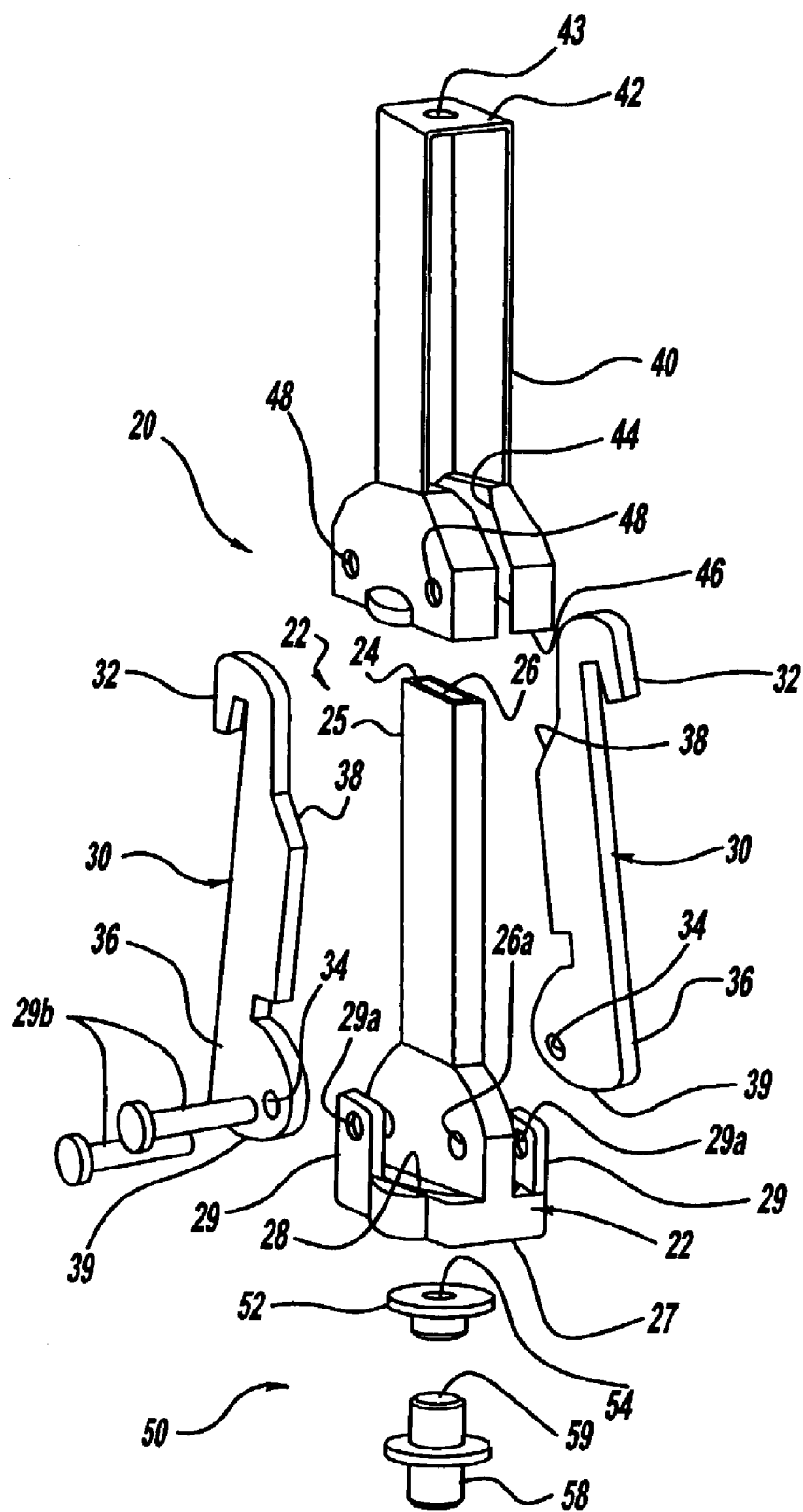
FIG. 1 is an exploded view of the secondary lock assembly according to the present invention.
Figure 2:
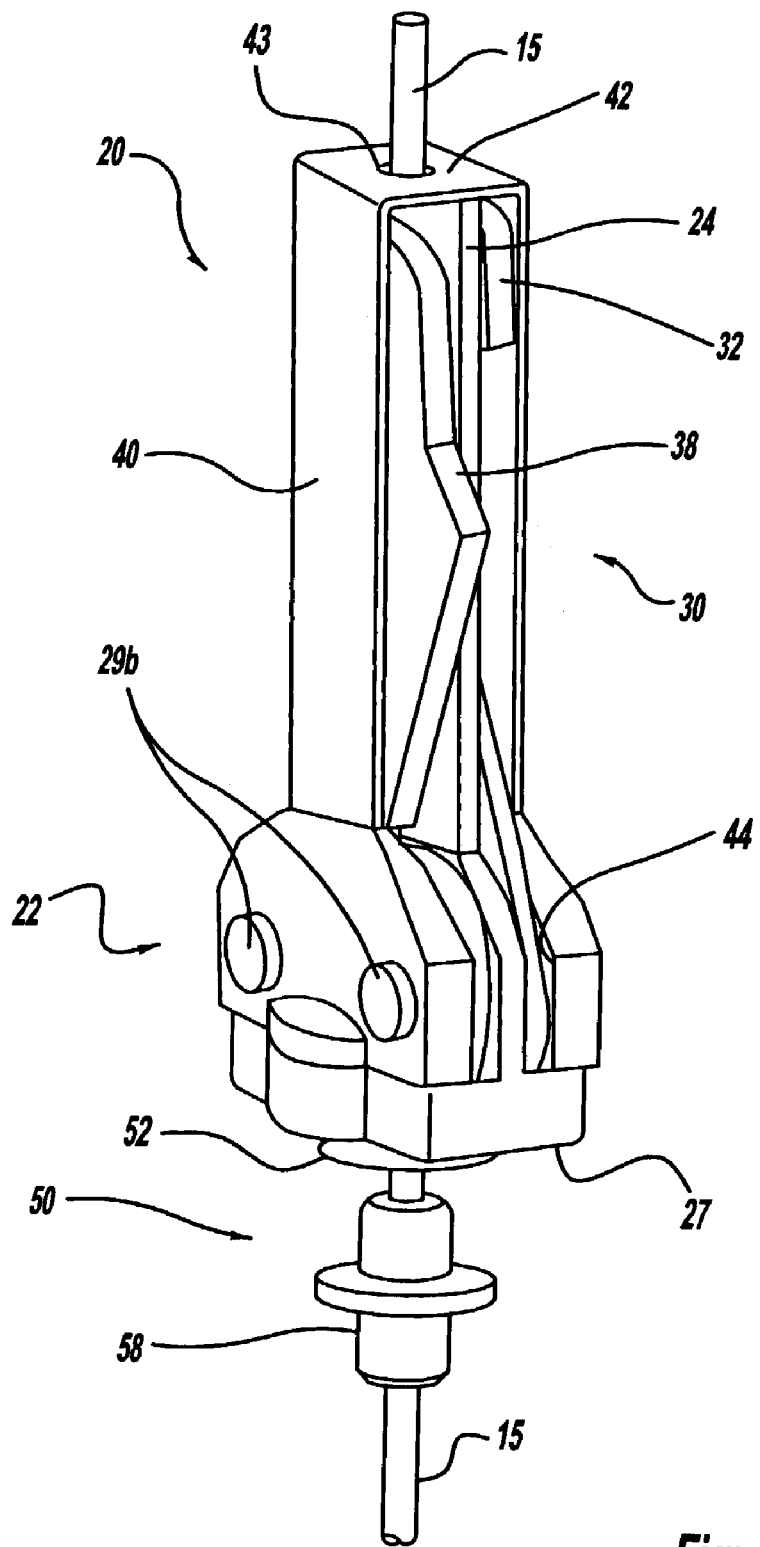
FIG. 2 is an assembled view of FIG. 1.
Figure 3:
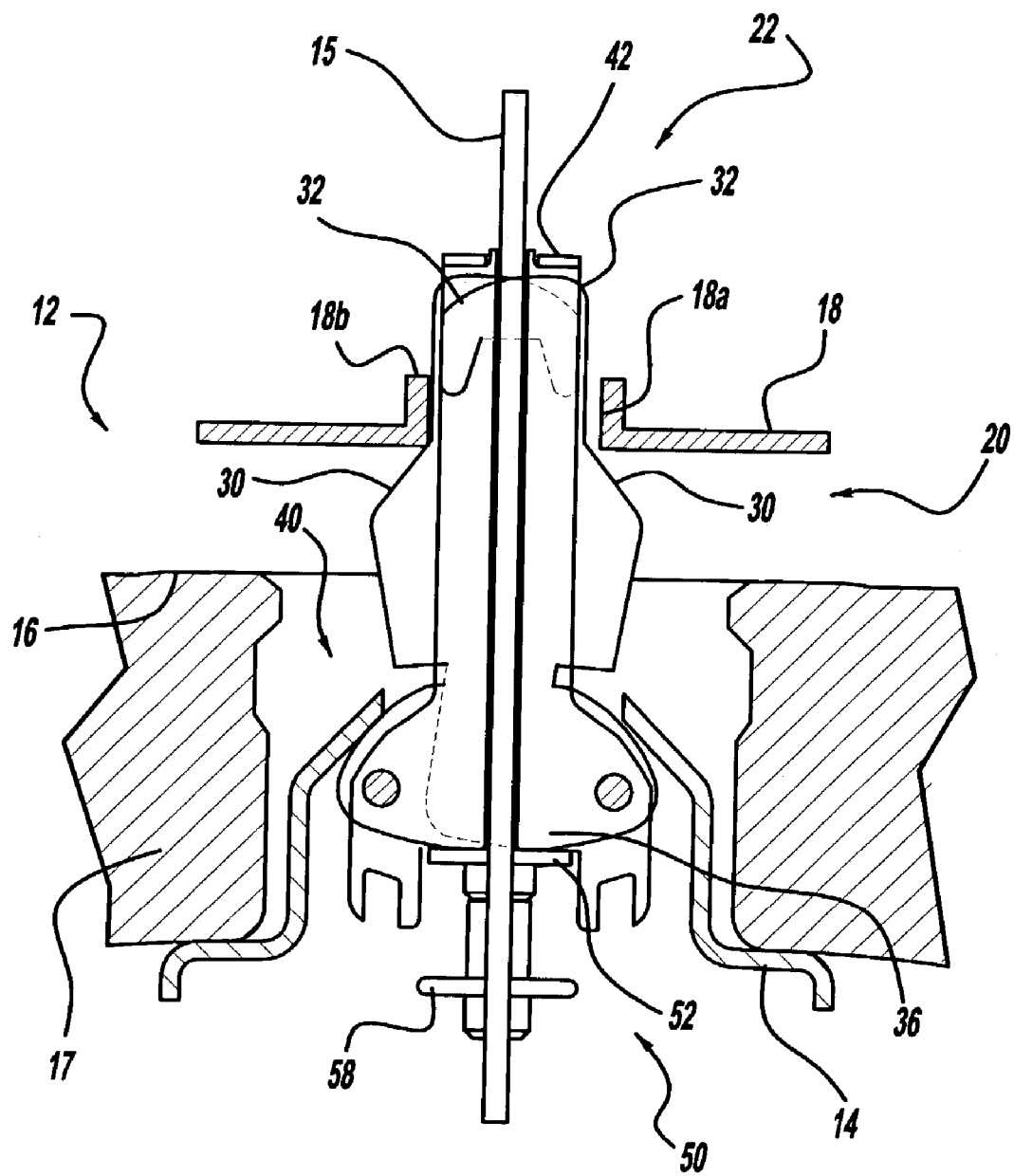
FIG. 3 is a partial cross sectional view of the secondary lock assembly in a spare tire storage system with the lock arms in an open position.
Figure 4:
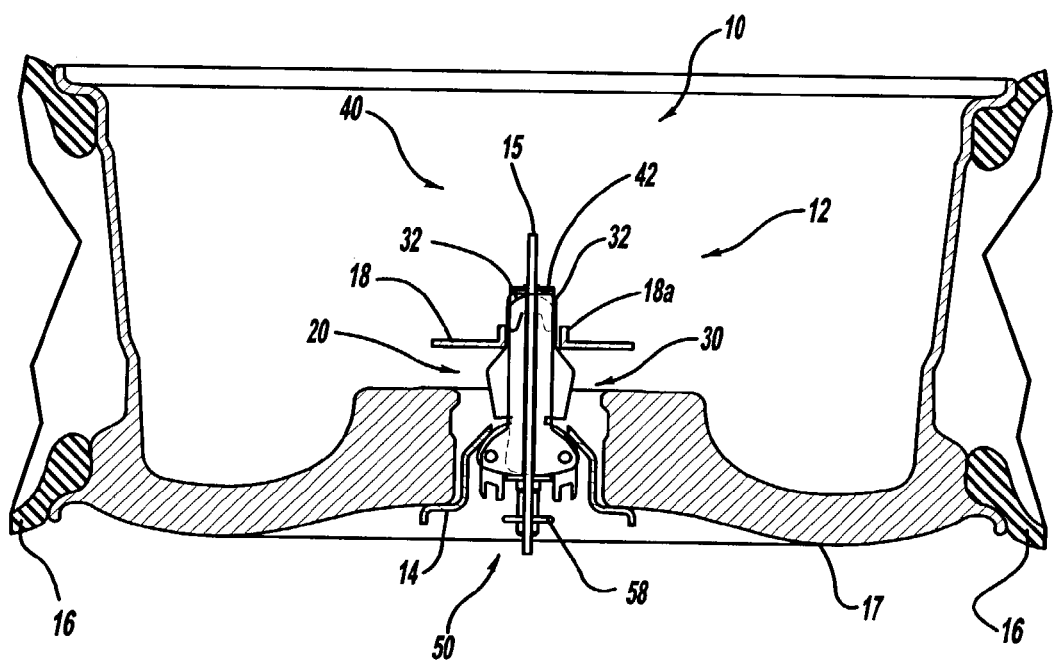
FIG. 4 is a partial sectional view of the secondary lock assembly with a full tire rim.
Figure 5A:
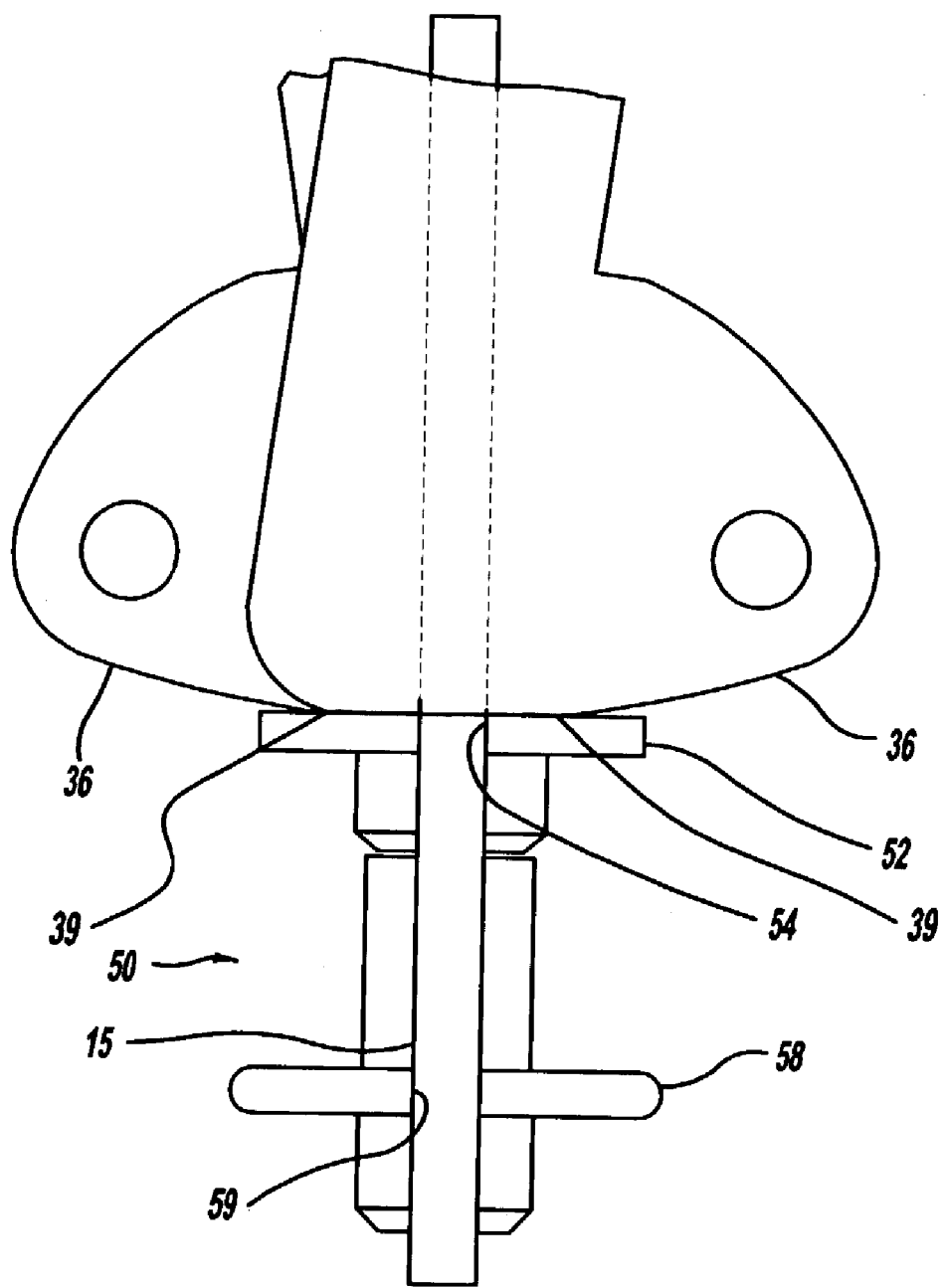
FIG. 5a is a simplified cross sectional view of the lower cam portions engaging the stop member to bias the lock arms to an open or unlocked position.
Figure 5B:
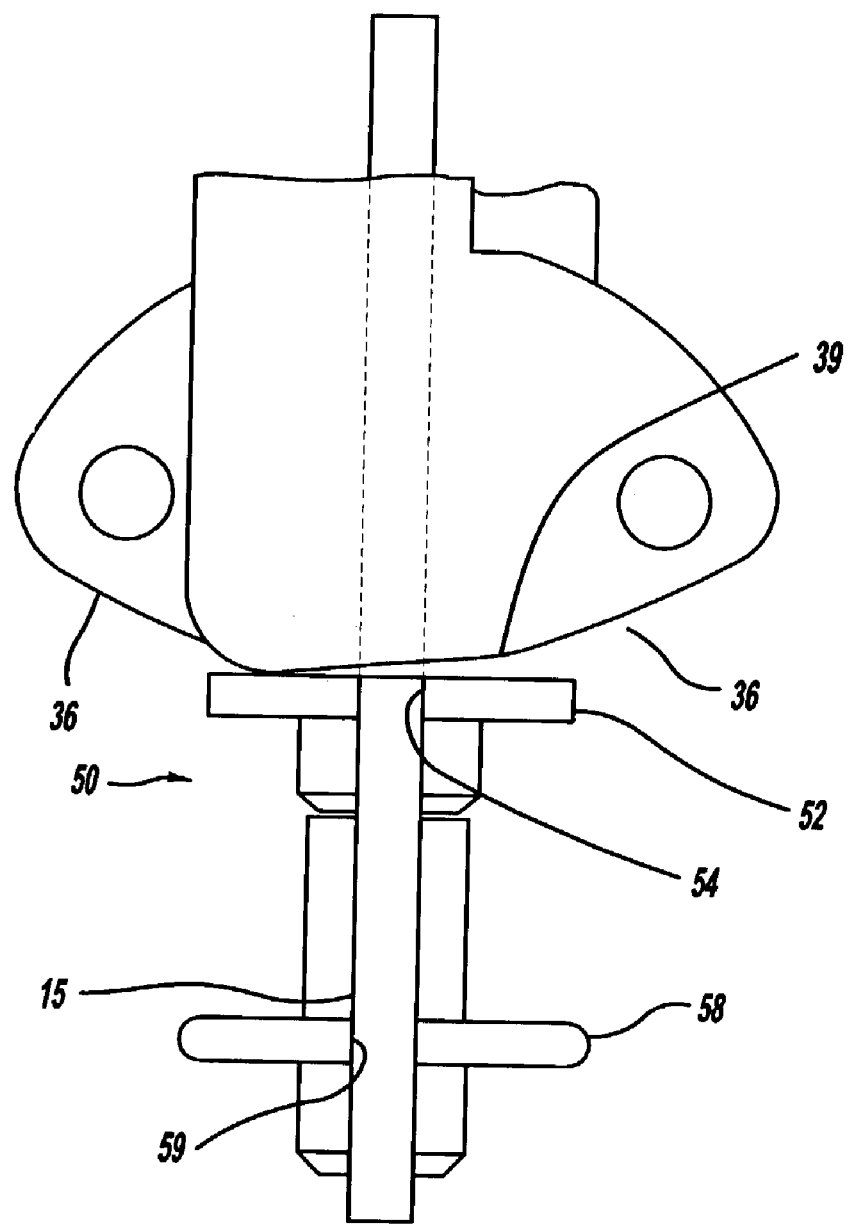
FIG. 5b is a simplified cross sectional view of the lower cam portions with the bias force from the weight of the housing on the stop member and the lock arm is overcome and the lock arms are moved to a closed or locked position.
Figure 6A:
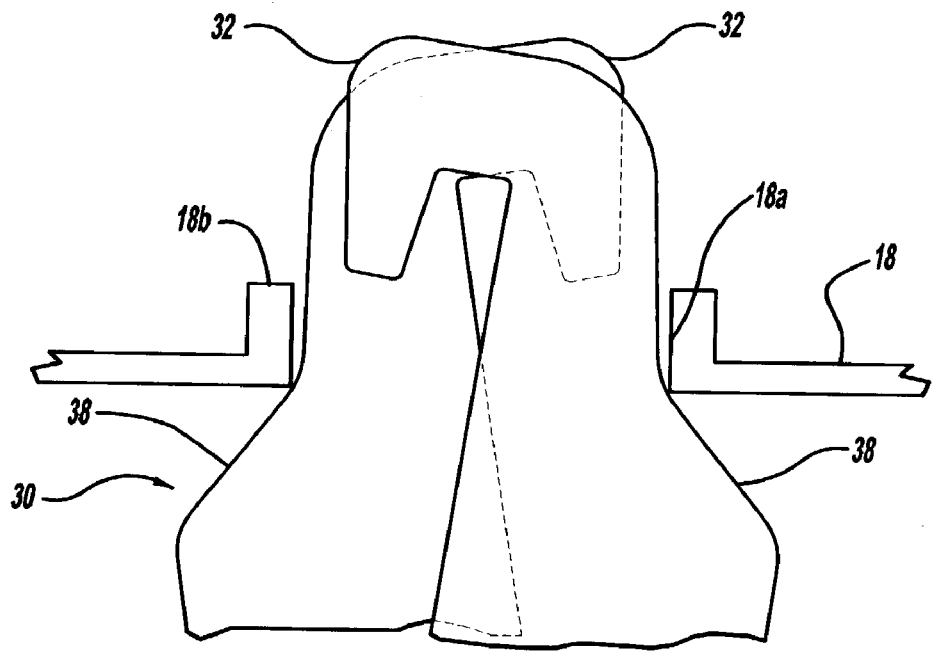
FIG. 6a is a simplified schematic partial cross sectional view of the lock arms as they engage the lock bracket.
Figure 6B:
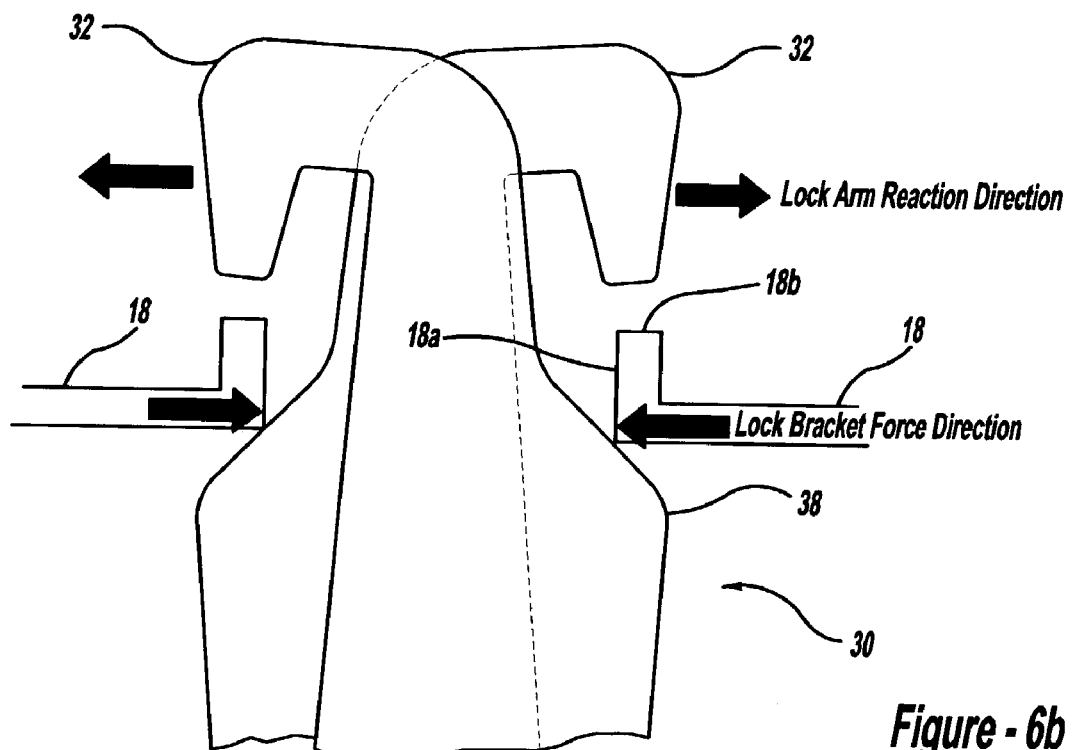
FIG. 6b is a simplified schematic partial cross sectional view of the lock arm as the cam surface engages the lock bracket while the secondary lock assembly is moving axially or vertically upward through the aperture in the lock bracket.
Figure 6C:
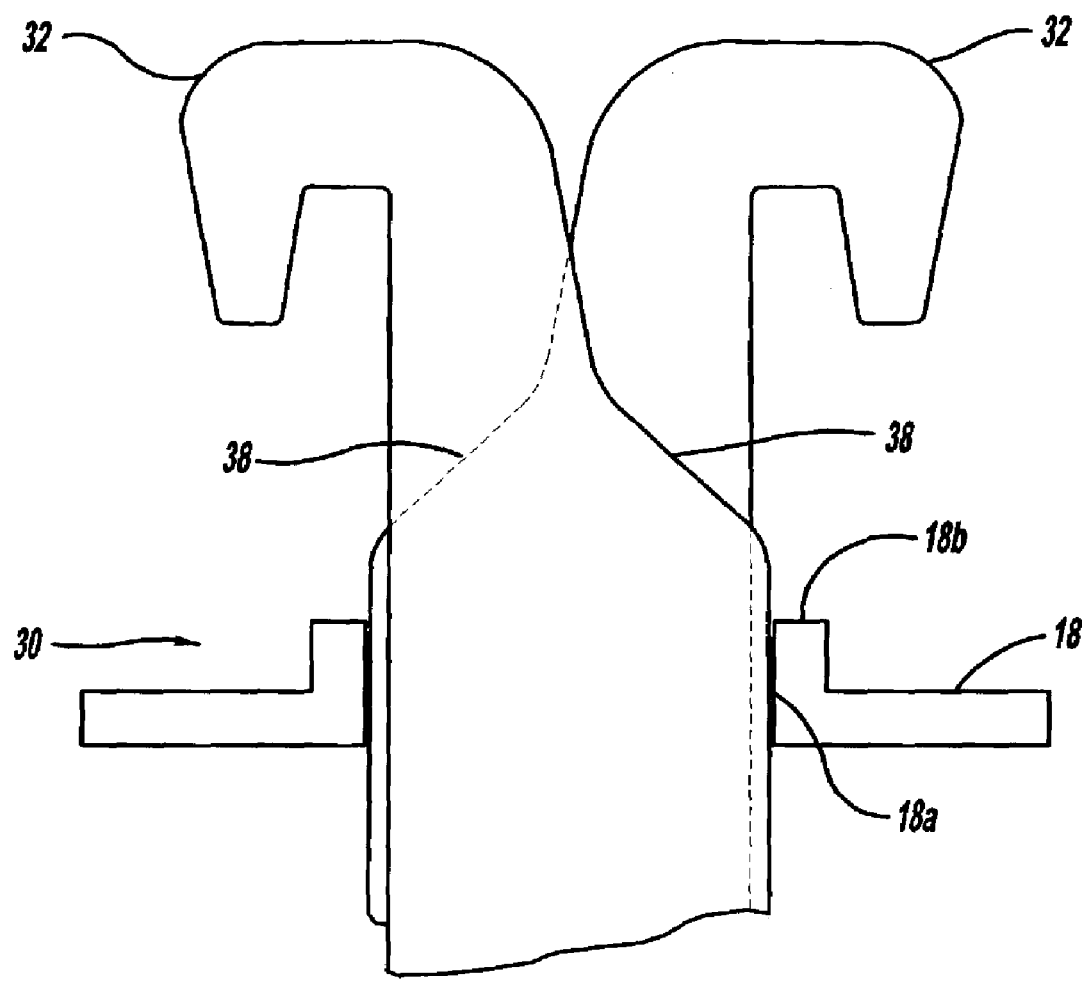
FIG. 6c is a simplified schematic partial cross sectional view of the secondary lock assembly in a fully stowed position after the cam surface passes through the aperture in the lock bracket and the lock arms are in a closed or locked position.
Figure 7:
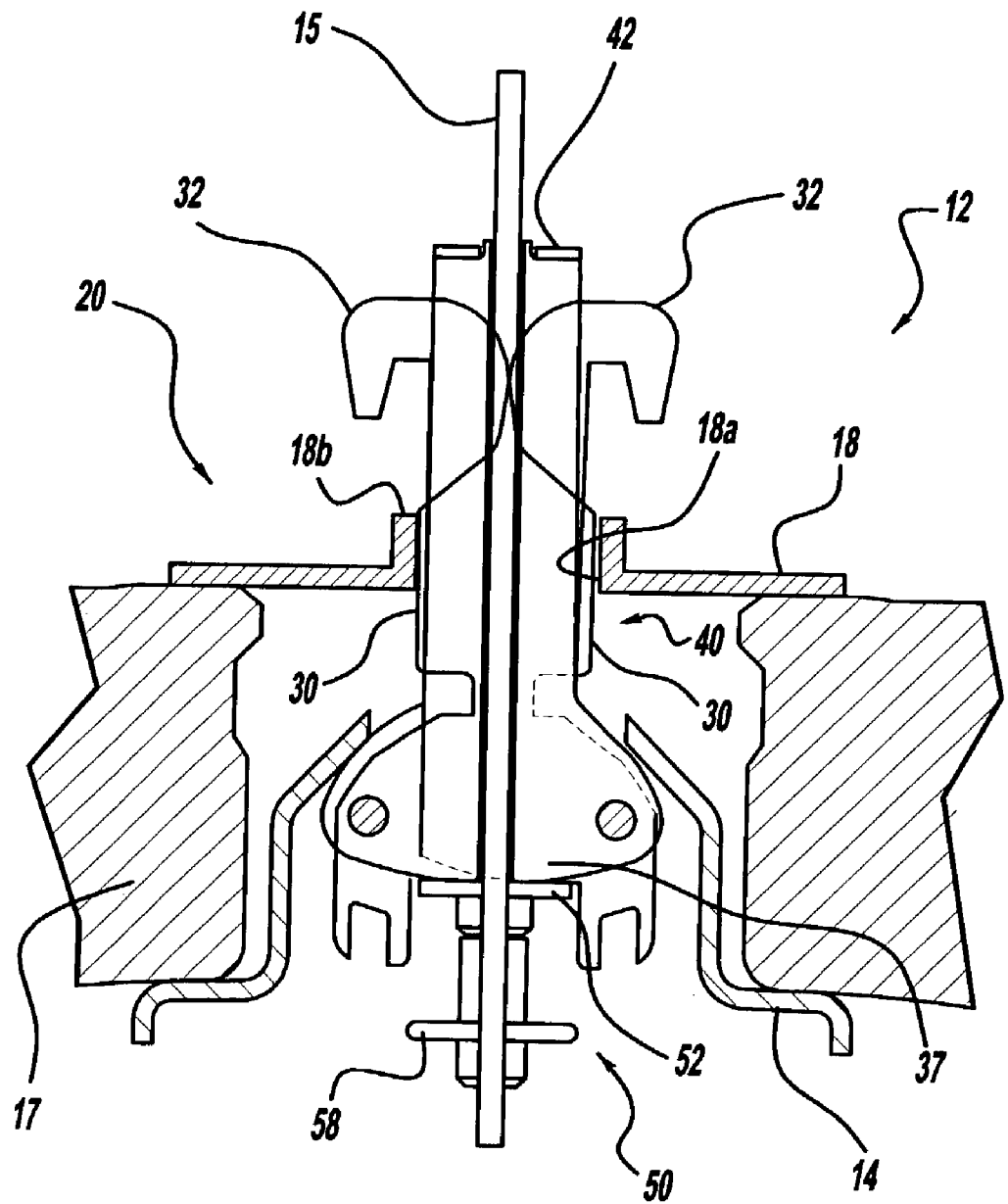
FIG. 7 is a partial cross sectional view of the secondary latch in a fully stowed condition of FIG. 6c.

It should be understood that the appended drawings are not necessarily to scale, presenting a somewhat simplified representation of various preferred features illustrative of the basic principles of the invention. The specific design features of a latching mechanism as disclosed herein, including, for example, specific shapes of the lock member or actuator arm will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the tire carrier illustrated in the drawings. In general, up or upward refers to an upward direction in the plane of the paper and down or downward refers to a downward direction in the plane of the paper.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved secondary latch for a tire carrier disclosed herein. The following detailed discussion of various alternative and preferred embodiment will illustrate the general principles of the invention with reference to a tire carrier for use with a motor vehicle. Other embodiments suitable for other applications will be apparent to those skilled in the art given the benefit of this disclosure.

Referring now to the drawings, FIGS. 1–8 illustrate tire carrier assembly 10 for a spare tire of a motor vehicle, such as a van or truck, utilizing secondary latch or lock assembly 20 according to the present invention. While the illustrated embodiment of the present invention are particularly adapted for use with a van or truck it is noted that the present invention can be utilized with any motor vehicle having inflated tires such as automobiles, recreational vehicles, off road vehicles for example, dune buggies, golf carts, and the like.

Tire carrier assembly 10 includes tire carrier 12 for carrying and supporting a spare tire 16 thereon, a winch assembly (not shown) for raising and lowering tire carrier 12 between an upper or storing position and a lower or accessing position, and secondary latch assembly 20 for securing or confining tire carrier 12 in the storing position.

Tire carrier 12 includes tire plate or wheel plate 14, flexible member 15 and lock bracket 18. The tire plate 14 is adapted for supporting the spare tire 16 on a tire rim 17. Tire plate 14 has a hole, which permits secondary latch assembly 20 to pass through and be captured on an inside surface. It is noted that the tire plate 14 can have many different forms.

The winch assembly is conventional and can take many forms. In one illustrative form as shown in U.S. Pat. No. 6,267,546, the winch assembly includes a shaft, a spool or reel rotatable on the shaft. Cable 15 is wound onto and off of the reel. The shaft is mounted to a housing for rotation about its central axis. The reel is mounted for rotation about the shaft and is adapted to wind and unwind flexible member 15 thereon upon rotation of the shaft. Flexible member 15 has one end attached to the reel (not shown) and the other end secured to secondary lock 20. The housing encloses the winch assembly within a hollow interior space. The housing has an open side for insertion of the winch assembly and an opening on a generally closed side opposite the open side for passage of the winch shaft there through. The housing has an opening at its bottom wall for passage of flexible member 15 from the reel to secondary lock 20. A cover plate generally closes the open side of the housing when secured thereto. The cover plate extends downwardly below the housing to cooperate with mounting or lock bracket 18. Mounting bracket 18 has an aperture 18a and an axially extending lip 18b for purpose to be described later on herein. The flexible member 15 includes a cable, rope, chain, cord or the like.

Secondary lock assembly 20 includes lock arm or cable guide portion 22, a pair of lock arms 30, lock housing 40, and spring assembly 50. As stated earlier, secondary latch assembly 20 is attached to the other end of flexible member 15.

Lock arm portion 22 has elongate top end 24 extending from base portion 27. Top end 24 has an elongated guide portion 25 with a hole 26. Base portion 27 has a bottom aperture 28, a pair of upright flanges 29 with holes 29a to receive pivot pins 29b therein and a pair of passages 26a. The other end of flexible member 15 passes through aperture 28 and hole 26.

Each of the pair of arms 30 has an elongate shape with a hook end 32, opposite end 36 and a side cam portion 38 between ends 32, 36 respectively and an end cam portion 39. Opposite end 36 has hole 34 to receive one pivot pin 29b therein. Pin 29b extends through passage 26a to pivotally connect one of the pair of arms 30 to lock portion 22 on one side of base portion 27 and to pivotally connect the other of the pair of arm 30 to lock portion 22 on the other side of base portion 27. Thus, each of the pair of arms 30 pivotally moves about each pivot pin 29b to oscillate relative to top end 24 of lock arm 22. The one and the other of the pair of arms 30 are laterally spaced apart from each other in an opposing orientation. Each lock arm 30 has an end or lower cam portion 39 that extends through aperture 28 and engages stop member 50. End or lower cam portion 39 is contoured so that when the weight of the housing abuts against the stop member, it forms a bias force. The stop member 50 engages cam end portion 39, and from a bias force to urge each hook end 32 to an open or unlocked position. When end cam portion 39 is no longer engaged by stop member 50 or if lock arm 30 is moved by contact of side cam portion 38 with a side wall of aperture 18a to overcome the bias force on stop member 50 or if the stop member no longer has the weight of housing to interact with end or lower cam portion 39, each hook end 32 moves toward a closed or locked position. Therefore, as will be discussed later on herein, in the absence of weight of the housing to create the bias force and the lack of engagement of stop member 50 on lower cam portions 39 of each of arms 30, the hook end 32 moves to a closed or locked portion because of the relationship of the pivot axis and center of gravity of each of arms 30.

Locking housing 40 has a similar elongate shape as lock arm 22. Lock housing 40 has top end 42 with aperture 43 into which flexible member 15 passes through, slot 44, a bottom open end 46 and a pair of laterally spaced apart holes 48, to receive pivot pins 29b therein. Lock housing 40 provides a protective cover for lock arm 22 and for the pair of lock arms 30, so as to protect them from dirt and debris. Slot 44 permits each of the pair of lock arms 30 to pass therethrough.

Lock arm portion 22 and lock housing 40 each have contoured surfaces that correspond to the inside surface of tire plate 14 so that the inside surface of tire plate 14 is nested on the contoured surfaces. Latch assembly 20 is adapted to permit passage of top end 24 and hook end 32 of each lock arm 30 through the hole in tire plate 14 but not allow passage of guide portion 22 and the bottom end of locking housing 40 past the contoured surface tire plate 14.

The other end of flexible member 15 is attached to stop member 50. Stop member 50 includes a cap 52 with a hole 54 and an end fitting 58 with a hole 59. The other end of flexible member 15 passes through hole 54, and hole 59. The end fitting 58 is fastened to the other end of flexible member 15 by conventional fastening means. Stop member 50 is disposed around flexible member 15 and extends between end fitting 58 and housing 40. Stop member 50 on one side abuts against end fitting 58 and on the other side of stop member 50 is adjacent to lock arm 30. The other side of member 50 engages each end cam portion 39. When the weight of housing 40 acts on stop 50, it forms a bias force that acts on the lower cam surface of each hook or lock arm 30 to keep each hook end 32 in an open or unlocked position. When stop member 50 no longer engages each end cam portion 39, each hock end 32 (because of gravity) rotates about its respective pivot pin 29b to a closed or locked position. Thus, when flexible member 15 breaks, and stop member 50 moves axially away from guide portion 25, lock arms 30 and locking housing 40 then the lock arms 30 move to a closed or locked position.

In operation, when it is desired to secure spare tire 16 in the stowed position, the other end of flexible member 15 is passed through the hole in tire arm 17 and secondary latch 20 is attached to the one end of flexible member 15. The winch assembly is actuated to axially move tire 16 from its accessing position (normally a support surface such as a roadway) to the stowed or storing position in the vehicle. As the winch continues to be operated, the tire contoured surface of arm 30, lock arm portion 22, and lock housing 40 engage the inside surface of tire plate 14 to retain tire 16 and tire rim 17 therein.

With secondary latch 20 engaging tire rim 17 and tire 16 and with continued operation of the winch assembly, flexible member 15 lifts or raises tire 16 from the support surface toward the stowed position in the vehicle. The weight of the tire 16 and tire rim 17 are supported by wheel plate 14, which is supported on the contoured surfaces of lock housing 40 and lock arm portion 22 and by reaction forces of stop member 50. As flexible member 15 becomes taunt, stop member 50 presses on base portion 27 of lock arm portion 22 and secondary lock assembly 20, and tire 16 and rim 17 move toward mounting bracket 18 (which is axially above the support surface). In this condition, lock arms 30 are in an open or unlocked position because of the reaction of the biasing force exerted on stop member 50 byte weight of the housing. This, in turn, presses against the end cam portion 39 of each lock arm 30. This is because a portion of each of the cam portions 39 extends below and away from the bottom of the housing. With still further continued operation of the winch assembly, top end 24 of lock arm portion 22 and hook end 32 or lock arms pass through aperture 18a of lock bracket 18 (see FIGS. 3 & 4). As flexible member 15 continues to be wound on the reel, each side cam portion 38 engages the edge of aperture 18a (see FIG. 6a). This causes each lock arm 30 to overcome the biasing force exerted by stop member 50 on end cam portion 39 so that each hook end 32 of both lock arms 30, pivot and translate radially toward each other and each hook end 32 moves radially apart from one to another (see FIG. 6b). With yet still further continued operation of the winch assembly, each hook end 32 moves toward a closed or locked position in order to permit each lock arm 30 to pass through aperture 18a until each hook end achieves a closed or locked position (see FIG. 6c). As long as secondary latch 20 is attached to flexible member 15, the weight of lock housing 40 causes stop member 50 to engage each end cam portion 39 to urge both lock arms 30 into an open or unlocked position. If flexible member 15 breaks, then stop member 50 disengages from contact with each end cam portion 39, and both lock arms 30, because of the pivot position and weight of the lock arms, the lock arms move to a closed or locked position.

Figure 8:
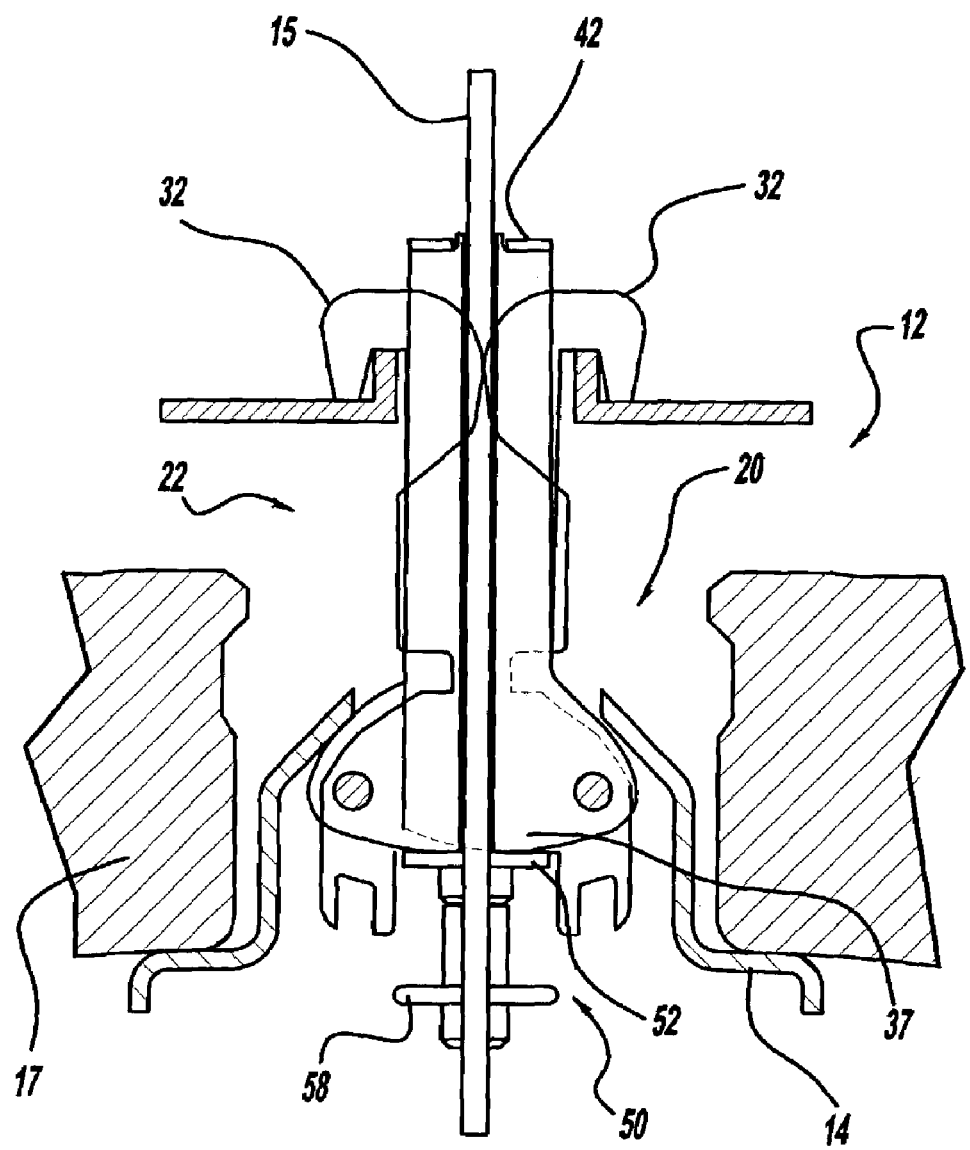
FIG. 8 is a partial cross sectional view of the secondary latch engaged to the lock bracket when the cable fails.

When flexible member 15 breaks or looses tension, hook end 32 of secondary lock assembly 20 in the closed or locked position moves axially downward to engage lip 18b on lock bracket 18 to hold tire 16 and tire rim 17 in the stowed condition and prevent tire 16 and rim 17 from moving axially away from mounting bracket 18 (see FIG. 8). This occurs because the weight of housing and optionally tire 16 acts on stop member 50 to cause lock arms to move axially to engage lip 18b.

The hook ends 32, lock housing 40 and lock arms 22 can be any suitable size and shape. Similarly these components may be made of any suitable material including corrosion resistant steel.

It should be appreciated from the above noted description that the secondary latch assembly of the present invention provides improved safety due to the hook locks being positioned to engage lip 18b of mounting bracket 18 in event of flexible member 15 failure. It provides reduced weight potential due to the ability to utilize plastic parts, and a relatively small number of total parts. It also provides improved ease of assembly due to the reduced number of parts, it requires a relatively low number of high tolerance parts and provides improved reliability of the operation of secondary latch 20 due to the bias force of the weight of the housing acting on the stop member and the lock arms 30.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the lock arm portion 22, the lock housing 40, and lock arms 30 and stop member 50 can have many different forms. The embodiments discussed were chosen and described to provide the best illustration of the principles of the present invention and its practical application to thereby enable one of the ordinary skill in the art to utilize the invention in various embodiments and with various modifications as are suited to the particular use contemplated. All such modifications and variations are within the scope of the present invention as determined by The invention as claimed is:

1. A latch assembly adapted for use with a vehicle tire carrier having a lock bracket with an aperture and a flexible member disposed in the aperture, the latch assembly comprising, in combination:
   a lock housing connected to the flexible member;
   a flexible member guide member adjacent to the lock housing;
   a lock arm adjacent to the flexible member guide member, the lock arm having one end, an other end, and a cam surface, the one end pivotally connected to the flexible member guide member, the lock arm being movable from an unlocked position to a locked position, wherein when the another end is moved toward the lock bracket, the cam surface engages the lock bracket to pivot the lock arm from an unlocked position to a locked position so that when the flexible member breaks, the lock arm engages the lock bracket, the lock arm further having a lower cam surface at the one end; and
   a stop member engaging the lower cam surface to bias the another end to an unlocked position.

2. The latch assembly claim 1 wherein the lock arm has a pair of opposing arms.

3. The latch assembly of claim 1 wherein the flexible member has an end fitting, the end fitting being formed with a surface to engage the lower cam surface.

4. The latch assembly of claim 1 wherein the flexible member has an end fitting, the stop member has a surface to engage the lower cam surface.

5. The latch assembly of claim 1 wherein the stop member has an aperture and a surface to bias the another end to an unlocked portion when a tire is supported by the flexible member.

6. A latch assembly adapted for use with a vehicle tire carrier having a lock bracket with an aperture and a cable disposed in the aperture, the latch assembly comprising, in combination:
   a lock housing connected to the cable;
   a cable guide member adjacent to the lock housing;
   a lock arm adjacent to the cable guide member, the lock arm having one end, an other end, and a cam surface, the one end pivotally connected to the cable guide member, the lock arm being movable from an unlocked position to a lock position, wherein when the other end is moved toward the lock bracket, the cam surface engages the lock bracket to pivot the lock arm from an unlocked position to a lock position so that when the cable breaks, the lock arm engages the lock bracket, the lock arm further having a lower cam surface at the one end; and
   a stop member engaging the lower cam surface to bias the other end to an unlocked position, wherein the stop member is adjacent to the cable.

7. A latch assembly adapted for use with a vehicle tire carrier having a lock bracket with an aperture and a cable disposed in the aperture, the latch assembly comprising, in combination:
   a lock housing connected to the cable;
   a cable guide member adjacent to the lock housing;
   a lock arm adjacent to the cable guide member, the lock arm having one end, an other end, and a cam surface, the one end pivotally connected to the cable guide member, the lock arm being movable from an unlocked position to a locked position, wherein when the other end is moved toward the lock bracket, the cam surface engages the lock bracket to pivot the lock arm from an unlocked position to a locked position so that when the cable breaks, the lock arm engages the lock bracket, the lock arm further having a lower cam surface at the one end, the lock arm having an upper cam surface, the upper earn surface engages the lock bracket to move the lock arm to a locked position; and
   a stop member engaging the lower cam surface to bias the other end to an unlocked position.

8. A tire stowage system for use with a vehicle and a spare tire, the tire stowage system comprising:
   a flexible member;
   a tire carrier connected to the flexible member;
   an elongate body adjacent the flexible member;
   a lock arm adjacent the elongate body, the lock arm having a pivot axis and center of gravity to move the lock arm to a closed position;
   a stop member connected to the tire carrier, the stop member acting on the lock arm when a tire is supported by the tire carrier to bias the lock arm in an unlocked position;
   a lock bracket for connecting to a vehicle, the lock arm engaging the lock bracket should the flexible member break;
   a cam for positioning the lock arm from an unlocked position to a locking position adjacent the lock bracket when a tire is moved from a non-stowed position to a stowed position.

9. The tire stowage system of claim 8 wherein the lock arm has a pair of opposing arms each with a hook end, each hook end being spaced from the lock bracket until the flexible member breaks.

10. The tire stowage system to claim 8 wherein the lock bracket has a portion forming a lip section for enganging the lock arm and an aperture for receiving the elongate body.

11. A latch assembly for a tire carrier having a flexible member supporting a tire and a lock bracket, the latch assembly comprising, in combination:
    a housing having a pair of pivotally mounted lock arms, each lock arm having a pivot axis and center of gravity to move the lock arm to a closed position, the lock arms having a portion to engage the lock bracket to move the lock arms to a locked position; and
    a stop member attached to the flexible member and adjacent the lock arms and forming a biasing force urging the lock arms toward an unlocked position, whereby when the lock arms engage an aperture of the lock bracket, the lock arms overcome the biasing force and move toward the locked position.

12. The latch assembly as claimed in claim 11 wherein each lock arm has a bottom cam portion and a side cam portion, the bottom cam portion being urged by the stop member to move the lock arm toward the unlocked position, the side cam portion engaging the aperture to move the respective lock arm toward the locked position.

13. The latch assembly as claimed in claim 11 wherein each lock arm has a bottom cam portion that is urged by the stop member to move each lock arm to the unlocked position.

14. The latch assembly as claimed in claim 11 wherein each lock arm has a hook end.

15. A latch assembly for use with a tire carrier having a lock bracket, the latch assembly comprising, in combination:
    a lock housing having a pivotally mounted lock arm, the lock arm having a pivot axis and center of gravity to move the lock arm to a closed position in the absence of weight on the housing;
    the lock arm including a cam for engaging a lock bracket to move the lock arm from an unlocked position to a locked position;

a stop member adjacent the lock arm and wherein the cam includes a bottom cam portion and a side cam portion, the bottom cam portion is urged by the stop member to move the lock arm toward the unlocked position, the side cam portion adapted to engage an aperture in the lock bracket moving the lock arm to overcome a biasing force on the stop member.

16. The latch assembly as claimed in claim 15 wherein the lock arm has a pair of opposing arms each with a hook end.

17. The latch assembly as claimed in claim 16 wherein the tire carrier has a flexible member, and the lock arm has a hook ends spaced from the lock bracket when the cam engages the lock bracket unless a flexible member breaks.

18. The latch assembly as claimed in claim 16 wherein the hook end of the pair of opposing arms is formed to engage a lip of the look bracket.

* * * * *